United States Patent

[11] 3,617,126

| [72] | Inventor | Donald E. Gillespie<br>Ann Arbor, Mich. |
|---|---|---|
| [21] | Appl. No. | 875,274 |
| [22] | Filed | Nov. 10, 1969 |
| [45] | Patented | Nov. 2, 1971 |
| [73] | Assignee | Jodon Engineering Associates<br>Ann Arbor, Mich. |

[54] REPOSITIONING APPARATUS FOR PHOTOGRAPHIC PLATES
8 Claims, 6 Drawing Figs.

[52] U.S. Cl. ........................... 355/72, 33/1 M, 33/184.5
[51] Int. Cl. ........................... G03b 27/58, G04d 7/00
[50] Field of Search ........................... 355/72, 74, 75, 76, 2, 53, 86, 95; 33/184.5, 56, 1 M

[56] References Cited
UNITED STATES PATENTS

| 1,552,127 | 9/1925 | Ellingson | 355/75 |
| 2,076,006 | 4/1937 | Sherman | 33/56 |
| 3,449,048 | 6/1969 | Allison | 355/75 X |
| 3,031,159 | 4/1962 | Waller | 248/496 |

FOREIGN PATENTS

| 341,451 | 1/1921 | Germany | 355/72 |
| 293,562 | 7/1928 | Great Britain | 355/72 |
| 922,868 | 4/1963 | Great Britain | 355/75 |

Primary Examiner—Samuel S. Matthews
Assistant Examiner—Robert P. Greiner
Attorney—Barnard, McGlynn & Reising ABSTRACT: A photographic plate holder for use in holography is disclosed. The plate holder includes apparatus for precise repositioning of the photographic plate after it has been removed for processing of a hologram recorded thereon. The photographic plate is retained in a plate carriage which in turn is removably supported in a kinematically stable mount on an adjustable member. The adjustable member is disposed upon a support member by a spring suspension system and is adjustable along X and Y-axes by means of a micrometer screw-spring displacement system which affords a high ratio of displacement reduction for positional adjustment in a reference plane parallel to the X and -axes.

PATENTED NOV 2 1971     3,617,126

INVENTOR.
Donald E. Gillespie
BY
Barnard, McGlynn & Reising
ATTORNEYS

REPOSITIONING APPARATUS FOR PHOTOGRAPHIC PLATES

This invention relates to holography and, more particularly, to a plate holder with means for precise repositioning thereof in a holographic system.

Holography is now well known as an image forming process in which a wavefront interference pattern is recorded and wavefront reconstruction therefrom is utilized to produce an image of three-dimensional objects. In the recording stage a hologram of an object is formed by illuminating it with a beam of coherent wave energy and recording the superposition of the reflected wavefront and a reference wavefront. The reflected wavefront alone lends intensity distribution to the recorded information, and the reference wavefront lends phase information to the recording. The two wavefronts taken together and superposed in the space occupied by the recording medium produces an interference pattern comprising fringe lines in the nature of diffraction grating. This interference pattern is commonly recorded on a photographic plate having a high resolution photographic emulsion. After development of the photographic plate, the image of the object may be reconstructed by illuminating the hologram by a wave front identical to the reference wavefront and diffraction by the hologram recreates the object wavefront. An observer looking through the hologram sees an image in three dimensions of the original object.

An important practical application of holography is that of holographic interferometry whereby minute changes in the position of the surface of an object may be detected. In real time or stored beam holography, which is especially useful for nondestructive testing, an interference pattern is produced between wavefronts from the recorded image and from the object. The hologram is reconstructed in the same position as when it was recorded while the object is simultaneously illuminated. The reconstructed image is thus superimposed on the object and interference fringes result wherever the object is slightly deformed or displaced, with reference to its condition at the time the hologram was made. Since the fringe lines of the interference pattern are spaced at distances corresponding to a fraction of the wavelength of the coherent beam, very small displacements or deformations may be detected and precise measurements may be made.

Because of the extreme sensitivity of the holographic interference pattern to minute displacement, it is of great importance that the photographic plate be positioned precisely the same when the reference hologram is made as when the interferometric view of the object is being made through the hologram. In one common technique for practicing real time holography the photographic plate holder must be removed from the holographic optical system for development of the photographic plate and then it must be repositioned back to its original location. Since the repositioning must be accurate to within a small fraction of a wavelength, the repositioning has heretofore been extremely time consuming and tedious as well as being a source of error in interpreting holograms.

Accordingly, an object of this invention is to provide apparatus for adjustably positioning an object such as a photographic plate in a precise spatial relationship with another element. More particularly, it is an object to precisely reposition a photographic plate with reference to an optical beam wavefront in a holographic system.

Another object of the invention is to provide apparatus for adjustably positioning the surface of a body in a plane along two coordinate axes therein.

Another object of the invention is to provide a photographic plate holder for holography in which a plate carriage is initially positioned for production of a hologram on the plate and then removed for processing of the plate and repositioned in the same plane to an accuracy of a small fraction of a wavelength of the initial position.

An additional object of the invention is to provide a mechanism for producing minute displacements of an adjustable member with reference to a support member by means of a unique micrometer screw-spring reduction system for producing translational motion.

An additional object of the invention is to provide a coarse positioning mechanism for a plate carriage by means of a kinematically stable mounting system which is stable along three coordinate axes.

A further object of the invention is to provide a plate carriage for use in holography adapted for coarse repositioning on a movable member and fine repositioning by minute displacement of the movable member and further adapted to hold a photographic plate in a predetermined position throughout processing thereof without producing distortion of the plate.

In accordance with the invention, there is provided apparatus especially adapted for precise positioning of a photographic plate for use in holography. The apparatus comprises a support member and an adjustable member mounted thereon by plural spring arms with additional spring means operatively connected between the members and adapted to urge the adjustable member in a direction parallel to a reference plane. Control means are provided on one of the members for deflecting the additional spring means and thereby deflecting the spring arms. The spring rate of the spring arms is greater than that of the spring means whereby the displacement of the control means produces a reduced translational displacement of the movable member parallel to the reference plane. Additionally, a removable plate carriage is provided in a stable mount on the adjustable member which comprises a pair of inclined pins on the latter and a pair of mating slots on the plate carriage. Means are provided to urge the plate carriage into engagement with the pins to seat the plate carriage thereagainst. One of the slots is V-shaped and, consequently, wedging action by the inclined pins seats the plate carriage against the adjustable member and also positions it in a transverse direction. Additionally, a plate carriage is provided with a photographic plate support means comprising two sets of multiple spring fingers which secures the plate without producing distortion thereof.

For a more complete understanding of the invention, reference is made to the detailed description that follows taken with the accompanying drawings in which FIG. 1 is a perspective view of the inventive plate holder with the parts in assembled relationship;

FIG. 4 is a sectional view taken on lines 4—4 of FIG. 2 and shows a detail of construction;

Figure 1:
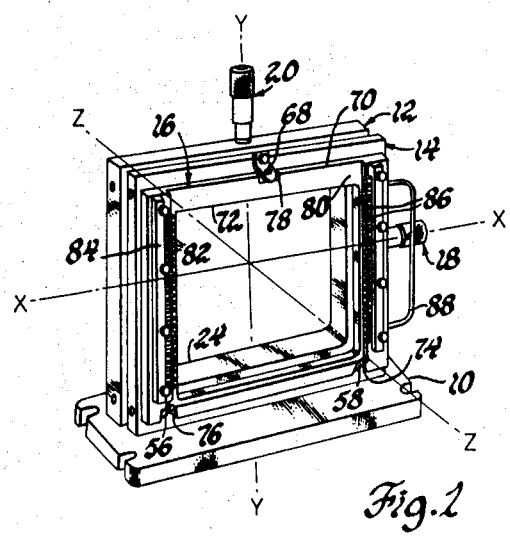

Referring now to the drawings, there is shown an illustrative embodiment of the invention in a photographic plate holder especially adapted for use in holography. In particular, the plate holder is adapted for holding the photographic plate during the production of a reference hologram and for repositioning the photographic plate to its original position for viewing the hologram and the object simultaneously as in real time interferometry.

In general, the photographic plate holder comprises a base member 10 adapted to be fixedly mounted on an optical bench. A support member 12 in the form of a rectangular frame is rigidly mounted on the base member and carries an adjustable member 14 the form of a rectangular frame by a suspension system to be described subsequently in detail. The adjustable member 14 carries a plate carriage 16 in a kinematic mount to be described subsequently and is adapted to retain a photographic plate (not shown) thereon. The plate carriage is adapted to hold the photographic plate, such as a glass plate of one millimeter thickness, in a fixed position relative to an orthogonal coordinate axis system represented by the X, Y and Z axes, as illustrated.

In order to permit precise repositioning of the photographic plate after removal of the carriage 16 for processing, the plate holder is provided with X-axis control means in the form of a micrometer screw 18 and Y-axis control means including micrometer screw 20, as well as the kinematically stable mount structure for positioning along the Z-axis. By this arrangement a reference hologram can be repositioned to an accuracy of a small fraction of a wavelength by translational displacement thereof in a direction parallel to the reference plane established by the X and Y axes.

Figure 3:
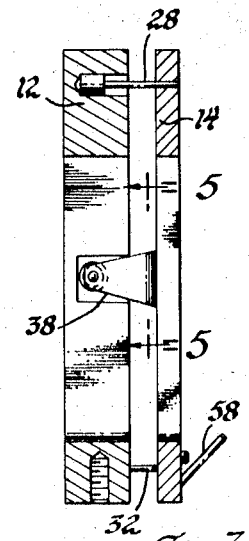
FIG. 3 is a view taken on lines 3—3 of FIG. 2.
Figure 2:
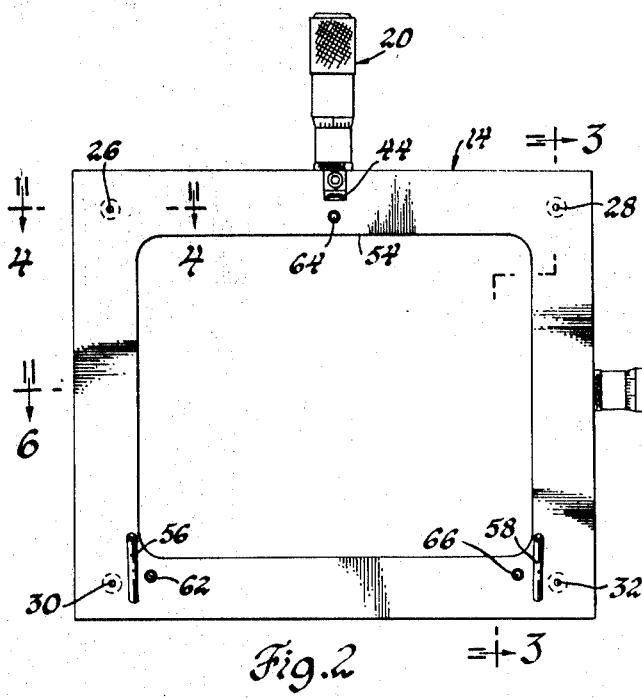
FIG. 2 is a front view of the support member.

The support member 12 in the form of a rectangular frame, preferably of unitary metal construction, defines an opening or window 24 therein. The support member 12 is adapted to support the adjustable member 14 which may also be in the form of a unitary rectangular frame and suitably of a lesser thickness than member 12. The adjustable member 14 is supported on the support member 12 by a suspension system comprising rodlike spring arms 26, 28, 30 and 32 disposed adjacent the respective corners of the support member 12 and adjustable member 14. As illustrated in FIGS. 3 and 4, each of the spring arms, for example spring arm 26, is provided with an enlarged head 34 at its inner end which is seated in a bore in support member 12 and secured in place by a set screw. The outer end of the spring arm 26 is suitably press fitted into a bore in the adjustable member 14. It is to be noted that each of the spring arms extend substantially normal to the support member 12 and, hence, the reference plane defined by the X and Y axes. Thus the spring arms 26 constitute a suspension system for the adjustable member 14 in the nature of a parallelogram linkage so that the adjustable member 14 is movable in a direction parallel to the reference plane by deflection of the spring arms. Furthermore, it is noted that the spring arms have a length which is great compared to the displacement range of the adjustable member 14 along the direction of the X-axis or Y-axis. Consequently, the arrangement is such that the adjustable member 14 is displaced in a direction substantially parallel to the reference plane upon the application of a force thereto along the X or the Y-axis.

Figure 6:
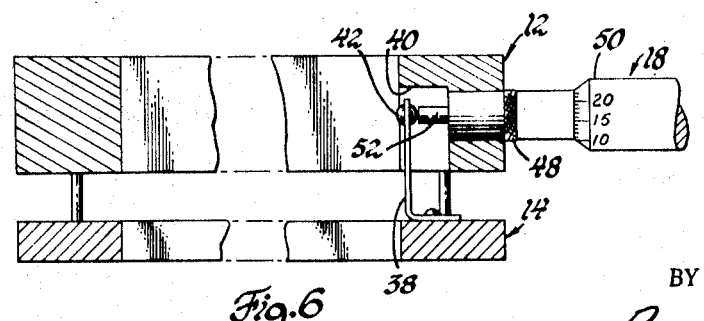
FIG. 6 is a sectional view taken on line 6—6 of FIG. 2.

In order to impart the desired displacement force to the adjustable member 14 along the X-axis, a spring means in the form of a leaf-spring 38 is mounted at one end on the adjustable member 14 and has its free end extending into a recess 40 in the sidewall of the support member 12. The leaf-spring 38 is suitably formed in an L-shaped configuration as shown in FIG. 6 with the base thereof secured by threaded fasteners to the adjustable member 14. The leaf-spring 38 is also of tapered configuration so that its outer or free end is of smaller width than the inner or base end and carries an antifriction ball 42, as indicated in FIG. 3. Additionally, the leaf-spring is formed so that in its free or undeflected position the spring plate forms an acute angle with the baseplate of the spring. Such a spring configuration has been found to provide the desired spring rate for the leaf-spring 38. In order to provide for imparting a deflecting force to the adjustable member 14 along the Y-axis, a spring means in the form of a leaf-spring 44 has its inner end secured to the adjustable member 14 and its outer or free end extending into a position adjacent the support member 12. The spring member 44 is preferably constructed and mounted in a manner identical to that of leaf-spring 38.

Figure 5:
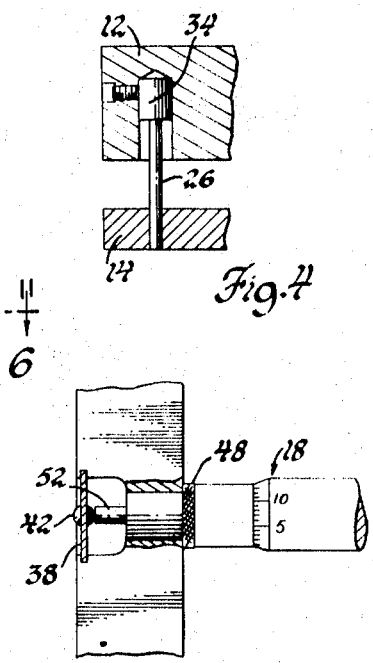
FIG. 5 is a view taken on lines 5—5 of FIG. 3 with parts broken away to show details of construction.

In order to impart a displacing force to the spring means or leaf-spring 38 along the X-axis, the control means in the form of micrometer screw 18 is mounted in the support member 12. As illustrated in FIGS. 5 and 6, the micrometer screw 18 is mounted with its barrel 48 in screwthread engagement with the support member 12 and fixedly seated thereagainst. The rotatable thimble 50 is suitably graduated at the inner end and is rotatable by a knurled handle at the outer end and, in a conventional manner, advances or retracts the spindle 52 which extends through the support member 12 into the recess 40 in alignment with the antifriction ball 42. Similarly, the control means in the form of the micrometer screw 20 is provided for imparting a displacement force along the Y-axis to the leaf-spring 44. The micrometer screw 20 is suitably mounted on the support member 12 and coacts with the leaf-spring 44 in a manner identical to that described with reference to micrometer screw 18 and leaf-spring 38.

A desired value of displacement reduction between the control means, for example micrometer screw 18, and the adjustable member 14 is provided by correlation of the leaf-spring 38 and spring arms 26, 28, 30 and 32. In particular, the displacement reduction, i.e., the ratio of displacement of micrometer spindle 52 to displacement of adjustable member 14, is determined by the relative value of the spring rates which, as used herein, means the force per unit deflection. The spring arms taken collectively have a spring rate which is very large compared to the spring rate of the leaf spring 38 and the leaf-spring 44, taken separately. The ratio of the spring rates may, for example, be on the order of several hundred to one. The micrometer screw may be selected so as to provide a linear displacement of the spindle of twenty-five thousands of an inch for each rotation of the handle. Thus, a small increment of rotation will produce a translational displacement of the adjustable member 14 which will correspond to a fraction of a wavelength of light.

The adjustable member 14 defines an inner aperture or window 54 in alignment with the window 24 of the support member 12. The adjustable member 14 is adapted to support the plate carriage 16 in a fixed or stable position in a manner which facilitates removal and replacement with the stable position being accurately reproducible. For this purpose, the movable member 14 is provided with an inclined pin 56 and an inclined pin 58 adjacent the lower edge thereof and spaced at opposite sides. The pins 56 and 58 are inclined at an acute angle with reference to the surface of the adjustable member 14 and, hence, with reference to the reference plane defined by the X and Y-axis. The inclined pins are suitably press-fitted into openings in the movable member 14 and have sufficient rigidity to support the plate carriage 16 without deflection or deformation in a manner which will be described subsequently. Additionally, adjustable member 14 is provided with three protuberances or seating points 62, 64 and 66 which are disposed thereon at the apices of an isosceles triangle. Such seating points are adapted to engage the back surface of plate carriage 16 at discrete surface areas thereon for positioning it along the Z-axis and for this purpose the outer extremities of the seating points define a plane parallel to the reference plane defined by the X and Y axes. The adjustable member 14 additionally includes a latching means in the form of a spring detent 68 having one end secured to the upper edge of the adjustable member 14 and the other end adapted to engage the upper edge of the plate carriage 16.

The plate carriage 16 comprises a rectangular frame 70 which defines an aperture or window 72 which may be aligned with the windows 54 and 24 in the adjustable member 14 and support member 12 respectively. The frame 70 is provided at its lower edge with a slot 74 of V-shaped configuration and adapted to receive and mate with the inclined pin 58. The slot 74 may be formed with inclined walls but the inclination thereof is preferably different from that of the inclined pin 58. Thus, the inclined pin 58 makes a two point contact with the frame 70 in the slot 74. The plate carriage 16 is also provided at its lower edge with a slot 76 which has parallel sidewalls and may have the end wall inclined at a somewhat different angle than inclined pin 56. Thus, the pin 56 makes a point contact with the frame 70 in the slot 76 with lateral clearance. The plate carriage is additionally provided with a notch 78 on the upper edge in a position adapted to mate with the spring detent 68.

It will now be apparent that the plate carriage 16 is supported upon the movable or adjustable member 14 by means of the inclined pins 56 and 58 which mate respectively with the slots 76 and 74. By reason of the V-shaped configuration of the slot 74 and its engagement with the inclined pin 58, the plate carriage 16 is wedged or urged laterally to a position in which the inclined pin 58 is positioned at the apex of the slot. The clearance provided by the width of slot 76 insures that inclined pin 56 will not interfere with the positioning action of the slot 74 and pin 58. By reason of the interaction of the inclined pin 56 and the end wall of the slot 76 together with the interaction of the inclined pin 58 and the apex of slot 74, the plate carriage is urged or wedged into seating engagement of the discrete surface areas on the back surface of the frame 72 with the seating points 62, 64 and 66 thus establishing the position of the plate carriage in the direction of the Z-axis. By reason of the positive stop afforded by engagement of the pins 58 and 56 with the end walls of the slots 74 and 76, the plate carriage position is established in the direction of the Y-axis.

For the purpose of removably mounting a photographic plate on the plate carriage 16, the frame 70 is formed with a seating surface or land on the front thereof extending along both side edges of the frame 70. The plate seating surface is relieved at shoulder 80 adjacent the upper and lower edges of the window 72 so the plate is supported by its side edges only. To retain the photographic plate in position upon the seating surface, there is provided a set of multiple spring fingers 82 having their inner or fixed ends secured to the frame 70 by a bar 84 with screw thread fasteners extending therethrough. The outer or free ends of the spring fingers 82 overlie the mounting surface for the photographic plate. Similarly, there is provided a set of multiple spring fingers 86 on the other side of the frame 70 which is constructed and mounted in the same manner as the spring fingers 82. Each of the spring fingers in the set 82 and in the set 86 are adapted to individually engage the photographic plate and hold it firmly seated against the seating surface. By reason of the individual spring fingers and the small value of localized force thereof, the photographic plate is firmly restrained in position and seated against the seating surface without the production of internal stress regions extending across the plate and distortion thereof. It will be appreciated that the photographic plate may be readily inserted into a plate carriage 16 by sliding it under the sets of spring finger 82 and 86 from the upper edge of the frame 70. A handle 88 is provided at the side edge of the plate carriage to facilitate handling thereof.

In use of the inventive plate holder, it will be appreciated that the photographic plate for recording a hologram is first inserted in the carriage 16 which is then positioned on the adjustable member 14 and by reason of the inclined pins 56 and 58 and coaction thereof with the slots 76 and 74 together with the spring detent 68 the plate carriage will be positioned with respect to the coordinate axes in a stable and reproducible position. After the plate is exposed by illumination of the object in the holographic system, it may be readily removed by releasing the detent 68. The plate is fully processed to develop the hologram with it in position on the plate carriage. After processing the plate carriage is repositioned on the adjustable member, and as previously described the initial position thereof during exposure will be reproduced The accuracy of repositioning is on the order of a few wavelengths by reason of the kinematically stable mount arrangement. In order to obtain the additional accuracy of repositioning necessary for high quality holographic interferometry, the X-axis micrometer screw 18 and the Y-axis micrometer screw 20 are manipulated. Considering the X-axis micrometer screw 18, for example, rotation of the handle thereof produces a linear displacement of the spindle 52 a distance which is suitably twenty-five thousandths of an inch for each rotation of the thimble. The leaf-spring 38 has a spring rate which is a small fraction of the spring rate of the spring arms 26, 28, 30 and 32 and, accordingly the increment of force produced by the leaf-spring 38 upon a full rotation of the micrometer screw is effective to produce a very minute displacement of the adjustable member 14 by deflection of the spring arms 26, 28, 30 and 32. By reason of the aforementioned relationship of the spring rates and the corresponding displacement reduction achieved thereby, it is possible to reposition the photographic plate in a plane parallel to the reference plane to an accuracy of a small fraction of a wavelength using both the X and Y-axis micrometer screws.

Although the description of the invention has been given with respect to a particular embodiment thereof, it is not be construed in a limiting sense. Many variations and modifications will now occur to those skilled in the art. For definition of the invention reference is made to the appended claims.

The embodiments of the invention in which an exclusive property or privilege is claimed are defined as follows:

1. Apparatus for translational displacement of an object substantially parallel to a reference plane, said apparatus comprising a support member, an adjustable member adapted to receive said object and mounted upon the support member by plural spring arms, said spring arms extending between said members transversely of said plane and being secured thereto, spring means operatively connected between said members and adapted to urge said adjustable member in a direction parallel to said plane, control means connected with one of said members for deflecting said spring means thereby deflecting said spring arms, the spring rate of said spring arms being greater than the spring rate of said pring means whereby displacement of the control means produces reduced translational displacement of the movable member parallel to said plane.

2. The invention as defined in claim 1 wherein said plural spring arms comprise four resilient rodlike elements of equal length and having a length which is many times greater than the range of deflection thereof.

3. The invention as defined in claim 2 wherein said spring means comprises a leaf-spring having one end connected to said adjustable member with the other end extending to a position adjacent the support member, and said control means comprises a micrometer screw mounted on the support member and adapted to engage the free end of said leaf-spring.

4. The invention as defined in claim 3 wherein said object is an optical element supported in a carriage said adjustable member comprises a frame including support means adapted to receive said carriage and provide coarse positional adjustment thereof with reference to the adjustable member, said control means being adapted to impart fine positional adjustment to the carriage with reference to said support member.

5. Apparatus for translational positioning of a photographic plate substantially parallel to a reference plane defined by orthogonally related X-axis and Y-axis and comprising a support frame adapted for mounting in a fixed position, an adjustable frame adapted to receive a photographic plate carriage and mounted upon the support frame by at least two pairs of rodlike spring members, said rodlike spring members being spaced apart and extending between said frames in a direction normal to said plane, each of said rodlike spring members being secured at one end to said support frame and at the other end to said adjustable frame, a first leaf-spring having one end secured to said adjustable frame and adapted for deflection in the direction of said X-axis and having the free end thereof disposed adjacent the support frame, an X-axis micrometer screw mounted in said support frame with the spindle thereof adapted to engage and deflect the free end of said leaf-spring, a second leaf-spring having one end secured to said adjustable frame and adapted for deflection in the direction of the Y-axis and having the free end thereof disposed adjacent the support frame, a Y-axis micrometer screw mounted in said support frame and having the spindle thereof adapted to engage and deflect the free end of the second leaf-spring, the spring rate of said rodlike spring members being substantially greater than the spring rate of said leaf-springs whereby rotation of either of said micrometer screws produces translatory displacement of said adjustable frame along the corresponding axis and substantially parallel to said reference plane.

6. The invention defined in claim 5 wherein said photographic plate is supported in a carriage, said adjustable frame including support means adapted to receive said carriage and provide coarse adjustment thereof with reference to the adjustable frame, said control means being adapted to impart fine positional adjustment to the carriage with reference to said support member.

7. The invention as defined in claim 6 wherein said adjustable frame includes three spaced seating points adapted to engage said plate carriage and further includes a pair of inclined pins adapted to engage positioning slots on said plate carriage.

8. The invention as defined in claim 7 including a plate carriage comprising a rectangular frame and two sets of multiple spring fingers, the sets being disposed on opposite sides of said rectangular frame and adapted to engage a photographic plate when inserted therein.

* * * * *